V. R. HELIN.
COMBINED MICROMETER AND SCALE.
APPLICATION FILED MAY 4, 1912.

1,153,785. Patented Sept. 14, 1915.

Witnesses:
Christ Feinle, Jr.

Inventor,
Vernie R. Helin.
By Victor J. Evans,
Attorney.

UNITED STATES PATENT OFFICE.

VERNIE R. HELIN, OF MINNEAPOLIS, MINNESOTA.

COMBINED MICROMETER AND SCALE.

1,153,785.

Specification of Letters Patent.   Patented Sept. 14, 1915.

Application filed May 4, 1912.   Serial No. 695,121.

*To all whom it may concern:*

Be it known that I, VERNIE R. HELIN, a citizen of the United States, residing at Minneapolis, in the county of Hennepin and State of Minnesota, have invented new and useful Improvements in Combined Micrometers and Scales, of which the following is a specification.

An object of the invention is to provide a device adapted to be employed as a scale, for measuring depths and for determining interior and exterior dimensions.

The invention embodies, among other features, a plurality of members, one arranged to slide on the other, with a scale provided on one of the members, the said members being adapted to coöperate for the purpose of determining inside and outside measurements, the readings of which can be calculated on the scale, one of the said members being adapted for measuring depths, the resulting depth being readable upon the said scale.

Figure 1:
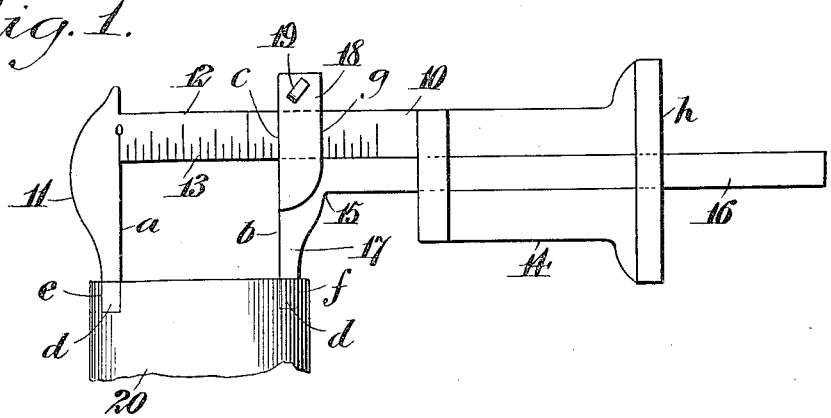
Figure 2:
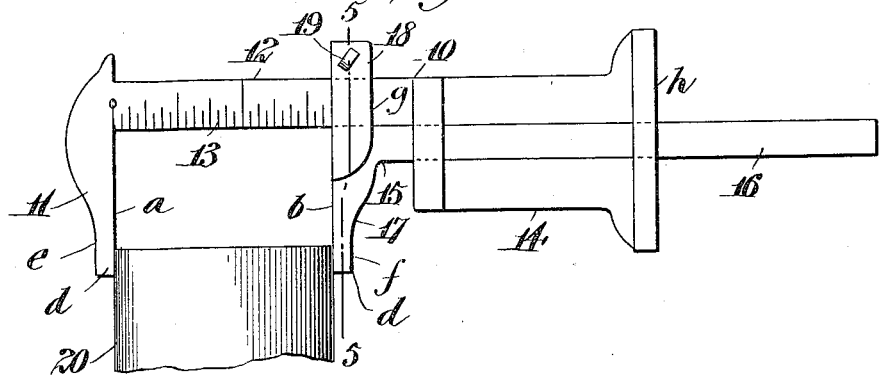
Figure 3:
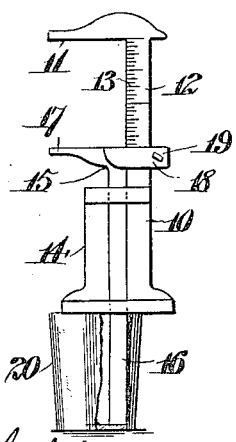
Figure 4:
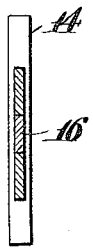
Figure 5:
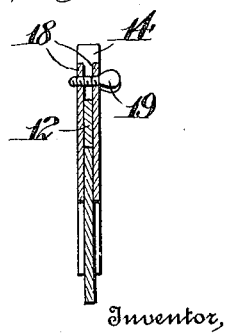

In the further disclosure of the invention reference is to be had to the accompanying drawings constituting a part of this specification in which similar characters of reference denote corresponding parts in all the views, and in which:

Figure 1 is a view looking at the front face of the device, showing the same employed to determine an inside measurement; Fig. 2 is a similar view showing the device applied to determine an outside measurement; Fig. 3 is a similar view of the device showing the same in an upright position and employed to determine the depth of an article; Fig. 4 is a vertical sectional view of the device taken transversely through the guide head and shank; and Fig. 5 is a vertical transverse sectional view taken on the line 5—5 in Fig. 1.

Referring more particularly to the views, use is made of a scale member 10 having a finger 11 formed at one end of a shank 12, forming a part of the scale member, the said shank being provided with a series of graduations 13, a guide head 14 being rigidly secured to the other end of the shank 12 and adapted to slidably receive therethrough a micrometer member 15 with a portion of the guide head projecting to one side of the scale member from an edge thereof, the said micrometer member constituting a shank 16, said shank being slidably extended through the guide head 14 and terminating at one end in a finger 17, spring-like guide plates 18 being secured to both sides of the finger 17 and extending in longitudinal alinement with and away from the finger 17 to extend across both sides of the shank 12, the free ends of the guide plates being connected by an adjusting screw 19. When the adjusting screw 19 is arranged loosely relative to the guide plates it will be readily understood that the micrometer member 15 can be easily slid on the shank 12 and guide head 14 of the scale member 10 and when the adjusting screw is tightened the inner faces of the guide plates will frictionally engage the outer face of the shank 12 to retain the micrometer member 15 in rigid position relatively to the scale member 10.

The graduations 13 on the shank 12, commence at the edge $a$ of the finger 11, and when taking an exterior measurement of a circular article such as a tumbler 20, shown in Fig. 2, the edge $a$ of the finger 11 and the edge $b$ of the finger 17 will abut against the periphery of the tumbler so that by reading the graduations 13 from the zero mark adjacent the edge $a$ to the reading adjacent the edge $b$, the exterior measurement of the tumbler will be ascertained. The guide plates 18 are preferably made wide enough at the point $c$ to equal the combined width of the fingers 11 and 17 at the point $d$, $d$ and, therefore, when it is desired to take an inside measurement the edge $e$ of the finger 11 and the edge $f$ of the finger 17 are adapted to engage the inner face of the tumbler 20 as shown in Fig. 1, the reading being then taken from the zero mark of the graduations to the edge $g$ of one of the guide plates 18, this being the inside measurement of the tumbler, as will be readily understood. Now when it is desired to determine the depth of the tumbler 20 the free end of the shank 16 is mounted to depend in the tumbler with an edge $h$ of the guide head 14 engaging the upper edge of the tumbler and it will thus be readily seen that the distance the shank 16 depends in the tumbler from the edge $h$ will be equal to the distance on the graduations 13, from the zero mark to a point adjacent the edge $b$ of one of the guide plates 18. The guide head 14 is preferably enlarged at one end so that the edge $h$ will be of sufficient thickness to permit of more readily applying my device to a tumbler or the like for the purpose of determining the depth of the same, and the mentioned edge $h$ extends laterally to the shank 16 so that for small work the edge $h$, together with the shank 16, can be conveniently employed for drawing right angles, an edge of the shank 16, when taken into consideration with a portion of the edge $h$, being adapted to form a right angle, as will be readily understood by referring to the views. Thus with the device described the depth of an article can be ascertained, the inside and outside measurements of the article can be also obtained, and by providing the graduations 13, the device can also be used in the same manner as an ordinary linear scale, it being understood that the readings of inside measurements, outside measurements and measurements of depth are all ascertained on the graduations 13.

Having thus described my invention, I claim:

In a combined micrometer and scale, the combination with a scale member, of a micrometer member slidable on the scale member, a guide head carried by the scale member and projecting to one side of the scale member from an edge thereof, a shank carried by the micrometer member and passing slidably through the said guide head, said shank lying flush with the body of the said scale member, a finger carried by the micrometer member, spaced spring-like guide plates, each plate having one of its ends secured to the said finger, said plates passing across the faces of the scale member, an adjusting screw connecting the free ends of the guide plates for clamping the said micrometer member in an adjusted position on the scale member, and a second finger formed integrally with the said scale member at one end thereof, the finger of the said micrometer member being adapted to lie flush with the said scale member and the said finger thereof.

In testimony whereof I affix my signature in presence of two witnesses.

VERNIE R. HELIN.

Witnesses:
GEORGE A. REINARTS,
LEWIS C. GYERTSEN.

Copies of this patent may be obtained for five cents each, by addressing the "Commissioner of Patents, Washington, D. C."